US011465222B2

(12) United States Patent
Takahashi et al.

(10) Patent No.: US 11,465,222 B2
(45) Date of Patent: Oct. 11, 2022

(54) ELECTRIC DISCHARGE MACHINING UNIT OF ELECTRIC DISCHARGE MACHINING APPARATUS

(71) Applicant: Sodick Co., Ltd., Kanagawa (JP)

(72) Inventors: Jun Takahashi, Yokohama (JP);
Yasuhiko Fujisawa, Yokohama (JP);
Yuzo Dohi, Yokohama (JP)

(73) Assignee: Sodick Co., Ltd., Kanagawa (JP)

( * ) Notice: Subject to any disclaimer, the term of this patent is extended or adjusted under 35 U.S.C. 154(b) by 288 days.

(21) Appl. No.: 16/898,953

(22) Filed: Jun. 11, 2020

(65) Prior Publication Data
US 2021/0039181 A1 Feb. 11, 2021

(30) Foreign Application Priority Data

Aug. 6, 2019 (CN) .......................... 201910722318.3

(51) Int. Cl.
*B23H 1/10* (2006.01)
*B23H 1/02* (2006.01)
*B23H 1/04* (2006.01)
*B23H 1/08* (2006.01)

(52) U.S. Cl.
CPC ............... *B23H 1/10* (2013.01); *B23H 1/028* (2013.01); *B23H 1/04* (2013.01); *B23H 1/08* (2013.01)

(58) Field of Classification Search
CPC . B23H 1/10; B23H 1/04; B23H 7/265; B23H 7/36; B23H 9/14; B23H 1/028
See application file for complete search history.

(56) References Cited

U.S. PATENT DOCUMENTS 5,420,388 A 5/1995 Girardin
6,403,910 B1* 6/2002 Stang ...................... B23H 9/14
219/69.15
(Continued)

FOREIGN PATENT DOCUMENTS

BR 9006030 A 8/1991
CN 102615006 A 8/2012
(Continued)

OTHER PUBLICATIONS

Machine translation of Japan Patent No. 2007054938-A, May 2022 (Year: 2022).*
(Continued)

*Primary Examiner* — Geoffrey S Evans
(74) *Attorney, Agent, or Firm* — Maier & Maier, PLLC

(57) ABSTRACT

An electric discharge machining unit capable of stably supplying working fluid to the vicinity of a portion to be machined. The electric discharge machining unit includes a tool electrode, a housing, an electrode guide, and a working fluid supplying device. The housing includes a fitting hole having a tapered surface. A first supply path is formed in the housing. The electrode guide includes a tapered portion and an ejection opening formed on a lower surface. A first flow path is formed in the electrode guide. The tapered portion is configured to be fitted into the fitting hole to connect the first flow path to the first supply path. The working fluid supplied from the working fluid supplying device to the first supply path and the first flow path is ejected from the ejection opening.

19 Claims, 9 Drawing Sheets

(56) References Cited

U.S. PATENT DOCUMENTS

| | | | |
|---|---|---|---|
| 6,448,528 B1 * | 9/2002 | Yoshida | B23H 9/14 219/69.15 |
| 6,933,456 B2 * | 8/2005 | Yokomichi | B23H 7/36 219/69.17 |
| 2005/0077269 A1 | 4/2005 | Yokomichi | |
| 2012/0193453 A1 | 8/2012 | Nakazono et al. | |
| 2014/0144884 A1 | 5/2014 | Suzuki et al. | |
| 2019/0388988 A1 | 12/2019 | Takahashi | |
| 2019/0388989 A1 | 12/2019 | Takahashi | |

FOREIGN PATENT DOCUMENTS

| | | | |
|---|---|---|---|
| CN | 103118826 A | | 5/2013 |
| CN | 103769705 A | | 5/2014 |
| CN | 104014891 A | | 9/2014 |
| CN | 207873328 U | | 9/2018 |
| CN | 109014455 A | | 12/2018 |
| CN | 109014456 A | | 12/2018 |
| JP | 2007054938 A | * | 3/2007 |
| JP | 4152602 B2 | | 9/2008 |
| JP | 2017064850 A | * | 4/2017 |
| JP | 6495518 B1 | | 4/2019 |

OTHER PUBLICATIONS

Chinese Office Action dated May 13, 2020 in corresponding application No. 201910722318.3; 13 pgs.

British Search Report dated Nov. 27, 2020, in connection with corresponding GB Application No. 2008529.6; 3 pages.

* cited by examiner

ELECTRIC DISCHARGE MACHINING UNIT OF ELECTRIC DISCHARGE MACHINING APPARATUS

TECHNICAL FIELD

The present invention relates to an electric discharge machining unit of an electric discharge machining apparatus configured to perform electric discharge machining on a workpiece using a tool electrode, and in particular, relates to an electric discharge machining unit configured to perform electric discharge machining in an air environment while ejecting working fluid onto a portion to be machined of the workpiece.

BACKGROUND ART

In some machining units installed in machine tools, a workpiece is machined in an air environment while working fluid used for cooling components are ejected to remove machining chips generated during machining. There is known a machining unit in which a flow channel of the working fluid or the like is formed in a component, such as a housing for accommodating a machining tool, in order to supply the working fluid to the vicinity of a portion to be machined.

Patent Literature 1 discloses an electric discharge machining apparatus configured to perform electric discharge machining on a workpiece while generating electric discharge between a tool electrode and the workpiece in an air environment. This electric discharge machining apparatus comprises an extended guide for accommodating the tool electrode and a housing for holding the extended guide, and a flow channel of working fluid is formed inside each of the housing and the extended guide. When the flow channels are connected to each other, the working fluid is supplied from a supplying device to the flow channel and is ejected to the vicinity of a tip portion of the tool electrode.

The tool electrode is replaced in consideration of consumption of the tool electrode or machining conditions, such as machining depth. When it is necessary to replace the tool electrode with one having a different outer diameter, a guide component of the tool electrode and the like is also replaced. Patent Literature 2 discloses an electric discharge machining apparatus comprising an automatic tool changer for replacing various kinds of tool electrodes of different diameters together with an electrode holder in fine hole electric discharge machining.

CITATION LIST

Patent Literature

Patent Literature 1: JP-B-6495518
Patent Literature 2: JP-B-4152602

SUMMARY OF INVENTION

Technical Problem

When the above-mentioned electric discharge machining unit is introduced, it is necessary to connect the flow channels formed inside the housing and the guide component each time the guide component is replaced together with the tool electrode. When the replacement is frequently performed, particularly when the replacement is performed by the automatic tool changer, it is difficult to reliably position the guide component, which is an obstacle to the introduction of the above-mentioned electric discharge machining unit.

The present invention has been made in view of such circumstances and is mainly intended to provide an electric discharge machining unit in which the flow channels can be reliably and easily connected between components when being attached to the electric discharge machining apparatus and that can stably supply the working fluid to the vicinity of the portion to be machined.

Solution to Problem

According to the present invention, provided is an electric discharge machining unit comprising a tool electrode, a housing, an electrode guide, and a working fluid supplying device, wherein the tool electrode is inserted through the electrode guide along a central axis of the electrode guide to perform electric discharge machining on a workpiece; the housing comprises a fitting hole having a tapered surface, the tapered surface being provided with a first supply path outlet; a first supply path connecting the working fluid supplying device and the first supply path outlet is formed in the housing; the electrode guide comprises a tapered portion tapering upward and an ejection opening formed on a lower surface; a first connection port is provided on a tapered surface of the tapered portion; a first flow path connecting the first connection port and the ejection opening is formed in the electrode guide; the tapered portion is configured to be fitted into the fitting hole to connect the first flow path to the first supply path via the first connection port and the first supply path outlet; and the working fluid supplying device is configured to supply working fluid to the first supply path and the first flow path, the working fluid being ejected from the ejection opening.

Advantageous Effects of Invention

In the electric discharge machining unit according to the present invention, a position of the electrode guide with respect to the housing in a direction of the central axis of the electrode guide is uniquely determined by fitting the tapered portion into the housing, so that the first supply path and the first flow path can be easily connected. Since the flow channels can be connected between the components more reliably and easily when the electrode guide is attached to the electric discharge machining apparatus, the electric discharge machining unit can be introduced to a process in which the electrode guide is frequently replaced or to the electric discharge machining apparatus in which the electrode guide is automatically replaced, thereby stably supplying the working fluid.

Hereinafter, various embodiments of the present invention will be exemplified. The embodiments described below can be combined with each other.

Preferably, the first flow path comprises a working fluid filling region formed between the tool electrode and an inner surface of the electrode guide and is connected to the ejection opening via the working fluid filling region.

Preferably, the first connection port comprises a first annular concave portion and a plurality of first openings; the first annular concave portion extends along a circumferential direction of the tapered portion; the plurality of first openings is formed on a bottom surface of the first annular concave portion so as to be separated from each other in a circumferential direction of the first annular concave portion; and the first connection port is connected to the first flow path via the first openings.

Preferably, the electric discharge machining unit further comprises a compressed gas supplying device, wherein a second supply path outlet is provided on the tapered surface of the housing; a second supply path connecting the compressed gas supplying device and the second supply path outlet is formed in the housing; a second connection port is provided on the tapered surface of the tapered portion; a second flow path connecting the second connection port and the ejection opening is formed in the electrode guide and comprises a compressed gas supply space and a mist generation space provided downstream from the compressed gas supply space; the working fluid filling region communicates with the mist generation space and is connected to the ejection opening via the mist generation space; the tapered portion is configured to be fitted into the fitting hole to connect the second flow path to the second supply path via the second connection port and the second supply path outlet; the compressed gas supplying device is configured to supply compressed gas to the second supply path and the second flow path; and the working fluid is mixed with the compressed gas in the mist generation space to be atomized and ejected as mist from the ejection opening.

Preferably, the second connection port is arranged closer to the lower surface of the electrode guide than the first connection port.

Preferably, the first connection port and the second connection port are provided at different heights from each other; at least one annular groove extending along a circumferential direction of the tapered portion between the first connection port and the second connection port is formed on the tapered surface of the tapered portion; and an O-ring is fitted into the annular groove.

Preferably, the compressed gas supply space of the second flow path comprises a pair of spaces provided along the working fluid filling region.

Preferably, the second connection port comprises a second annular concave portion and a plurality of second openings; the second annular concave portion extends along a circumferential direction of the tapered portion; the plurality of second openings is formed on a bottom surface of the second annular concave portion so as to be separated from each other in a circumferential direction of the second annular concave portion; and the second connection port is connected to the second flow path via the second openings.

Preferably, the electric discharge machining unit further comprises a plurality of dies guiding the tool electrode and arranged so as to be separated from each other, wherein a gap is provided between the tool electrode and each of the dies.

Preferably, the electrode guide further comprises a die fixing portion provided downstream from the tapered portion; the die fixing portion is configured to fix at least one die, among the plurality of dies, arranged downstream from the tapered portion; a plurality of working fluid ejection grooves is formed on an inner surface of the die fixing portion so as to be separated from each other in a circumferential direction of the inner surface of the die fixing portion; and the working fluid filling region communicates with the mist generation space via the working fluid ejection grooves.

Preferably, the tool electrode is configured to be rotatable about the central axis.

DESCRIPTION OF EMBODIMENTS

Hereinafter, embodiments of the present invention will be described with reference to the drawings. Various characteristics described in the embodiments below can be combined with each other. The invention is independently established for each characteristic.

1. Configuration of Electric Discharge Machining Unit

Figure 1:
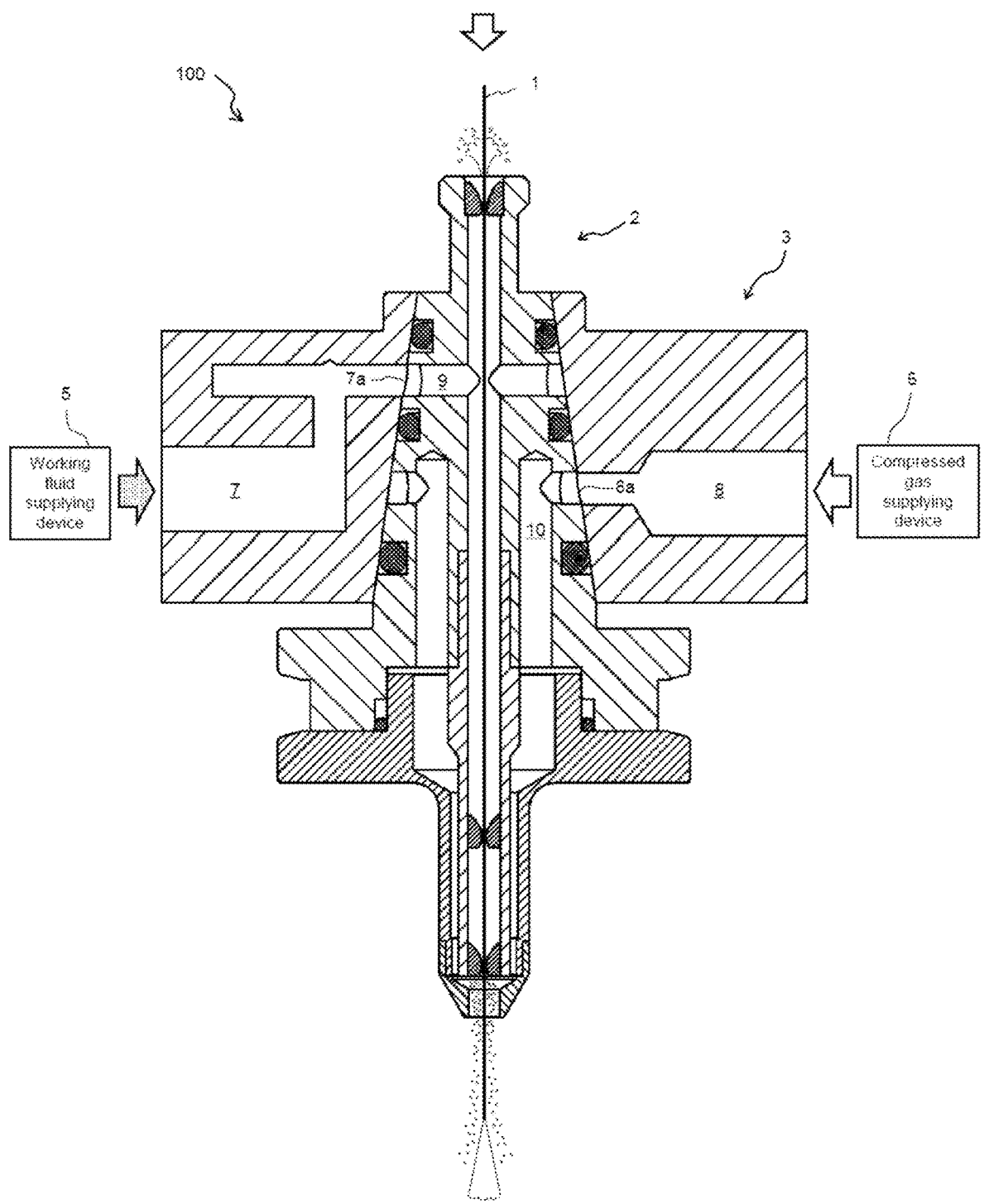
FIG. 1 is a front cross-sectional view of an electric discharge machining unit according to an embodiment of the present invention in a plane passing through a central axis of an electrode guide.

As shown in FIG. 1, an electric discharge machining unit 100 of one embodiment of the present invention is configured to perform electric discharge machining on a portion to be machined of a workpiece (not shown) while ejecting a mist of working fluid to the portion. The electric discharge machining unit 100 comprises a tool electrode 1, an electrode guide 2, a housing 3, a working fluid supplying device 5, and a compressed gas supplying device 6. Here, arrows (white arrows) from above and a right side of the electric discharge machining unit 100 in FIG. 1 indicate compressed gas supplied from the compressed gas supplying device 6, while an arrow from the working fluid supplying device 5 indicates working fluid supplied from the working fluid supplying device 5.

1.1. Tool Electrode

The tool electrode 1 is a cylindrical pipe electrode having a hollow hole inside and has an outer diameter of, for example, 0.3 to 3.0 mm. The tool electrode 1 is inserted through the electrode guide 2 so that at least a tip can project along a central axis of the electrode guide 2, and a voltage is applied between the tool electrode 1 and the workpiece to generate electric discharge. The tool electrode 1 can be rotated, during electric discharge machining, about the central axis of the electrode guide 2 by a rotation driving unit (not shown) disposed above the electric discharge machining unit 100. The rotation driving unit includes, for example, a motor that applies rotational power to the electrode guide 2, a pinion fixed to the output shaft of the motor, and a spur gear that meshes with the pinion. Further, the compressed gas is supplied from the compressed gas supplying device 6 into the hollow hole of the tool electrode 1 and is ejected onto the portion to be machined of the workpiece. In this regard, while the tool electrode 1 of the present embodiment is the pipe electrode having the hollow hole with a circular cross section, a pipe electrode having any shape or the any number of hollow holes may be used, or a rod-shaped electrode without a hollow hole may be used. Further, the tip portion of the tool electrode 1 may have any shape as long as the tool electrode 1 can be inserted through the electrode guide 2.

1.2. Housing

Figure 2:
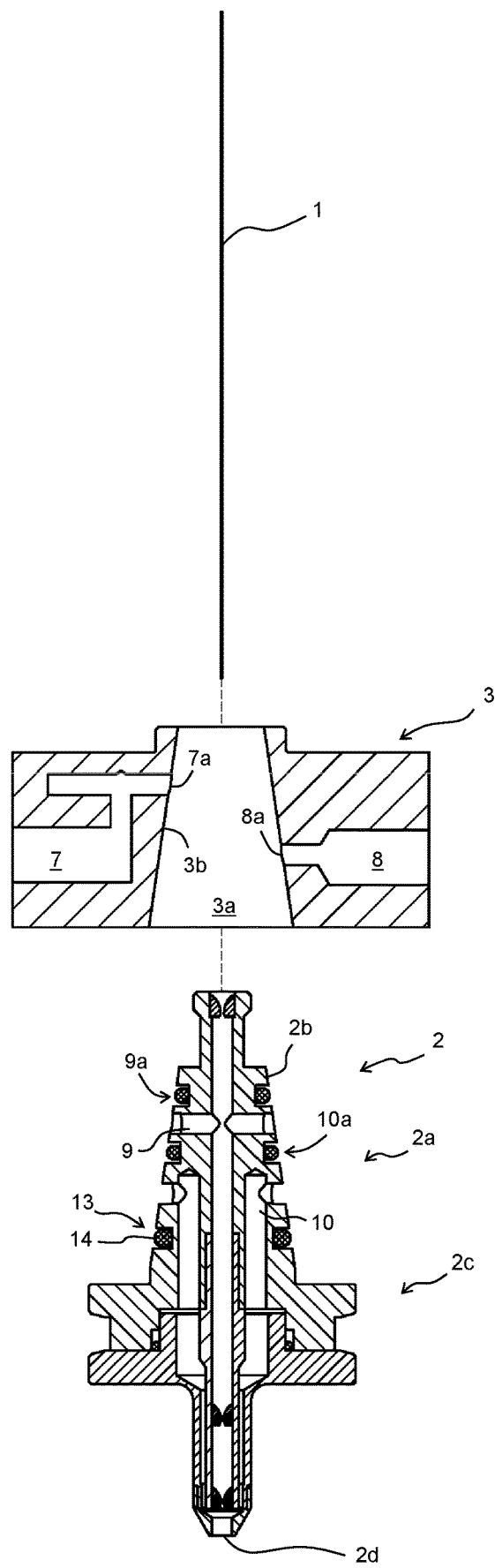
FIG. 2 is an exploded view of the electric discharge machining unit according to the embodiment of the present invention.

As shown in FIG. 1 and FIG. 2, the housing 3 comprises a fitting hole 3a having a tapered surface 3b and is supported by a support mechanism (not shown) disposed above the electric discharge machining unit 100. The tapered surface 3b of the housing 3 is provided with a first supply path outlet 7a and a second supply path outlet 8a. A first supply path 7 connecting the working fluid supplying device 5 and the first supply path outlet 7a and a second supply path 8 connecting the compressed gas supplying device 6 and the second supply path outlet 8a are formed in the housing 3. The first supply path 7 is a flow channel for supplying the compressed working fluid from the working fluid supplying device 5 to the electrode guide 2, and the second supply path 8 is a flow channel for supplying the compressed gas from the compressed gas supplying device 6 to the electrode guide 2.

1.3. Working Fluid Supplying Device

The working fluid supplying device 5 is configured to supply the compressed working fluid. The working fluid supplying device 5 includes, for example, a tank that stores the working fluid, a pump that pumps the working fluid from the tank, and a pipe that connects each part. As the working fluid, water, a water-soluble working fluid, an oil-based working fluid or the like may be used. In the present embodiment, water is used as the working fluid.

1.4. Compressed Gas Supplying Device

The compressed gas supplying device 6 is configured to supply the compressed gas. The compressed gas supplying device 6 is, for example, a compressor. As the compressed gas, air, oxygen, nitrogen, argon or the like may be used. In the present embodiment, air is used as the compressed gas.

1.5. Electrode Guide

Figure 3:
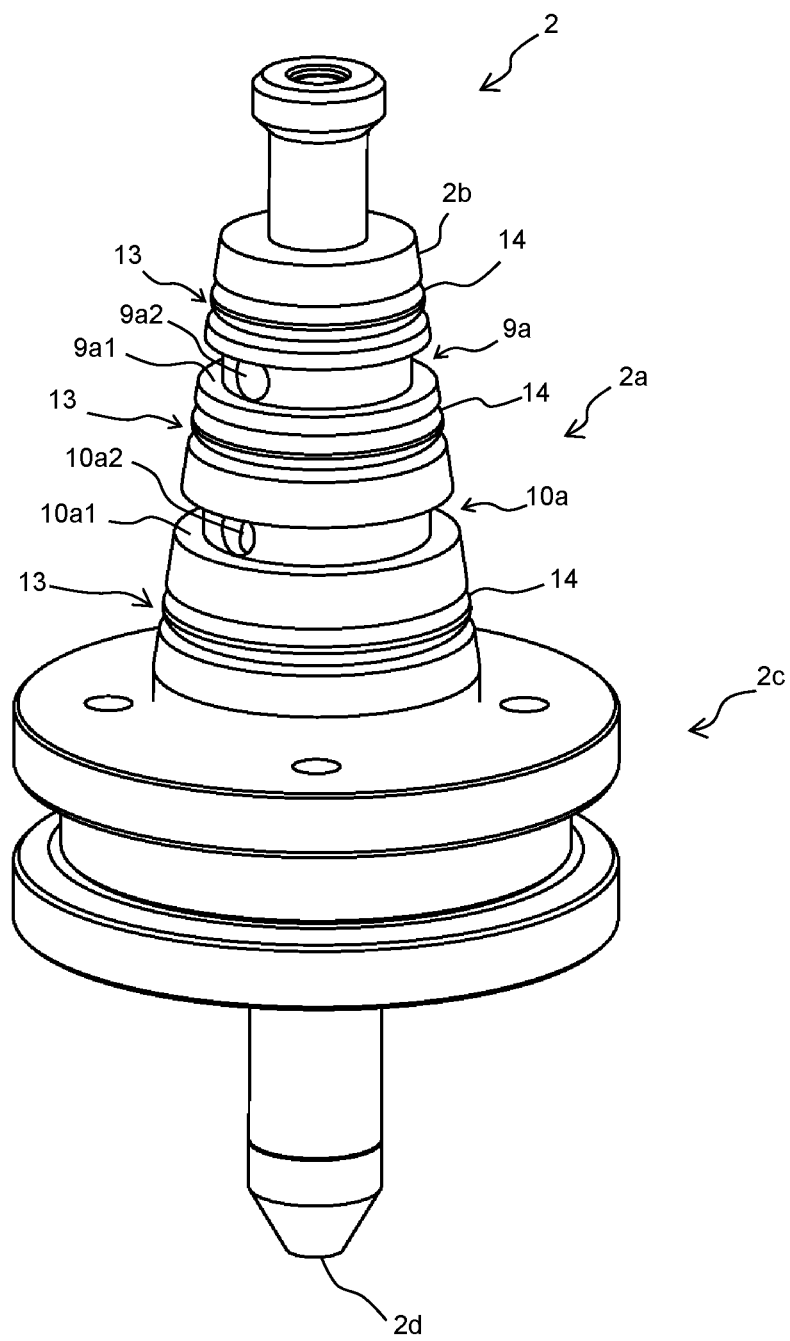
FIG. 3 is a perspective view of the electrode guide according to the embodiment of the present invention.
Figure 4:
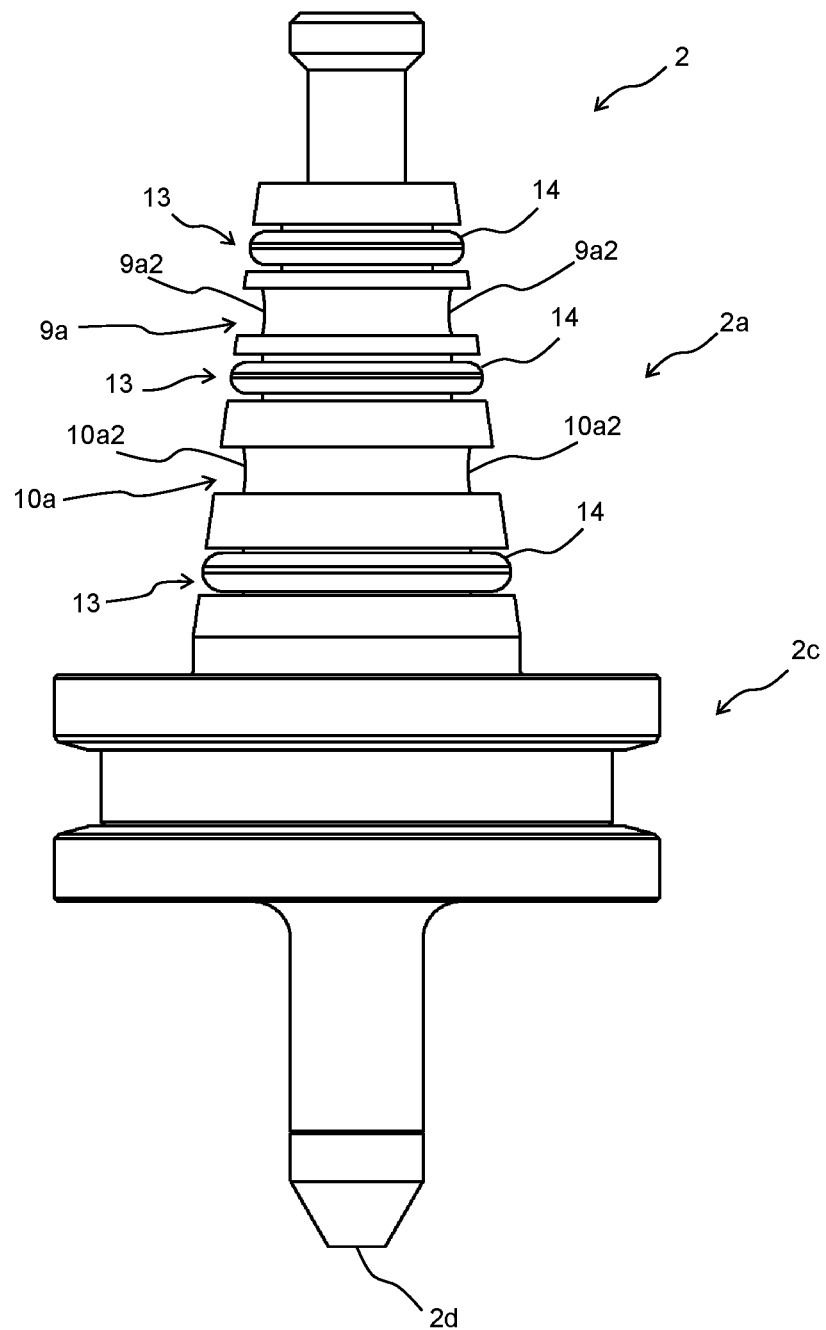
FIG. 4 is a front elevational view of the electrode guide according to the embodiment of the present invention.

As shown in FIG. 3 and FIG. 4, the electrode guide 2 comprises a tapered portion 2a tapering upward, a die fixing portion 2c provided below the tapered portion 2a, in other words, on a downstream side with respect to the flow of the compressed gas, and an ejection opening 2d formed on a lower surface. The electrode guide 2 is detachably attached to a pull-up mechanism (not shown) disposed above the electric discharge machining unit 100, in a state of being biased upward by a spring (not shown) of the pull-up mechanism. A tapered surface 2b of the tapered portion 2a is provided with a first connection port 9a and a second connection port 10a each having an annular concave portion extending along a circumferential direction of the tapered portion 2a so that the second connection port 10a can be located closer to the lower surface of the electrode guide 2 than the first connection port 9a.

Figure 5:
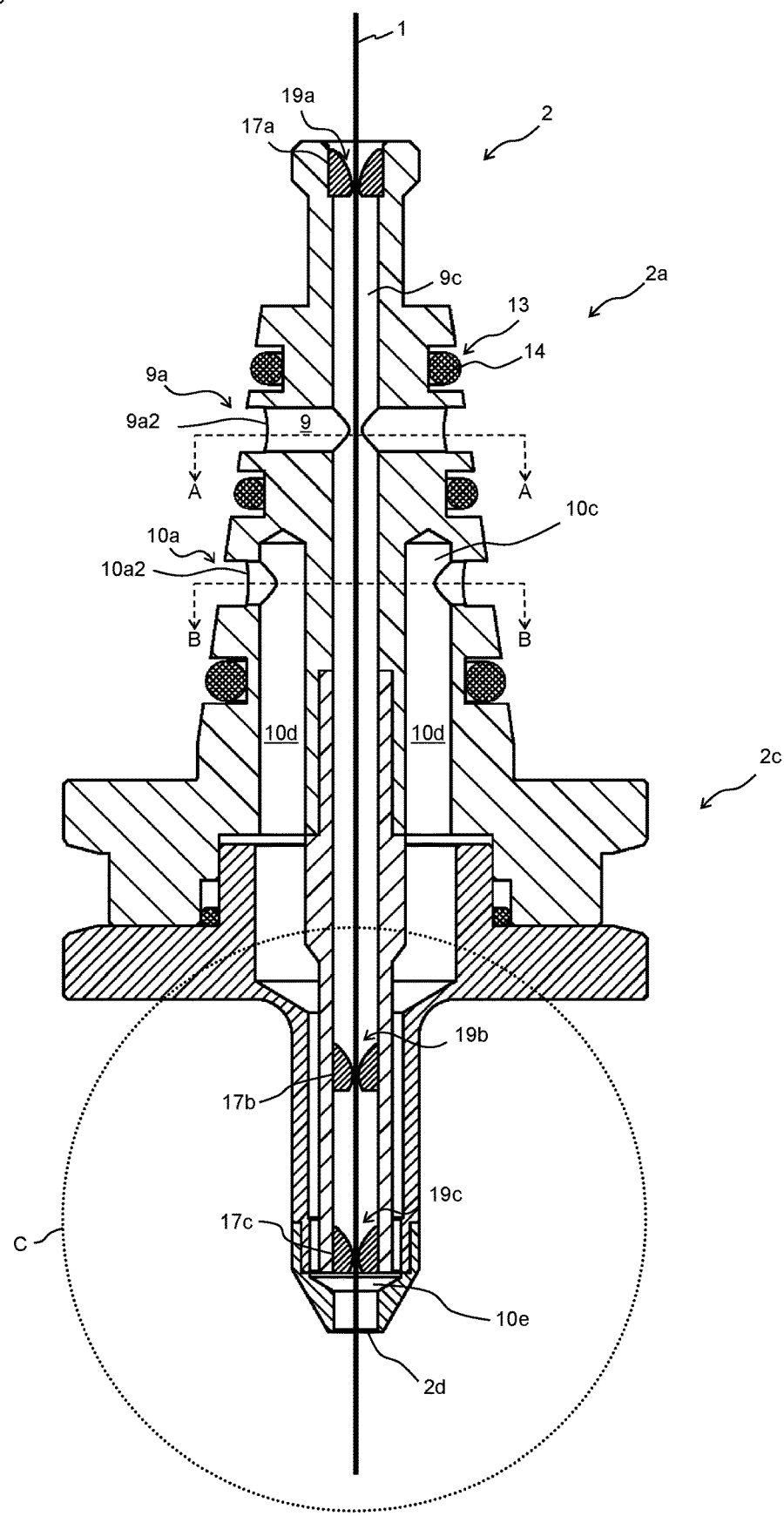
FIG. 5 is a cross-sectional view of the electrode guide according to the embodiment of the present invention.
Figure 6:
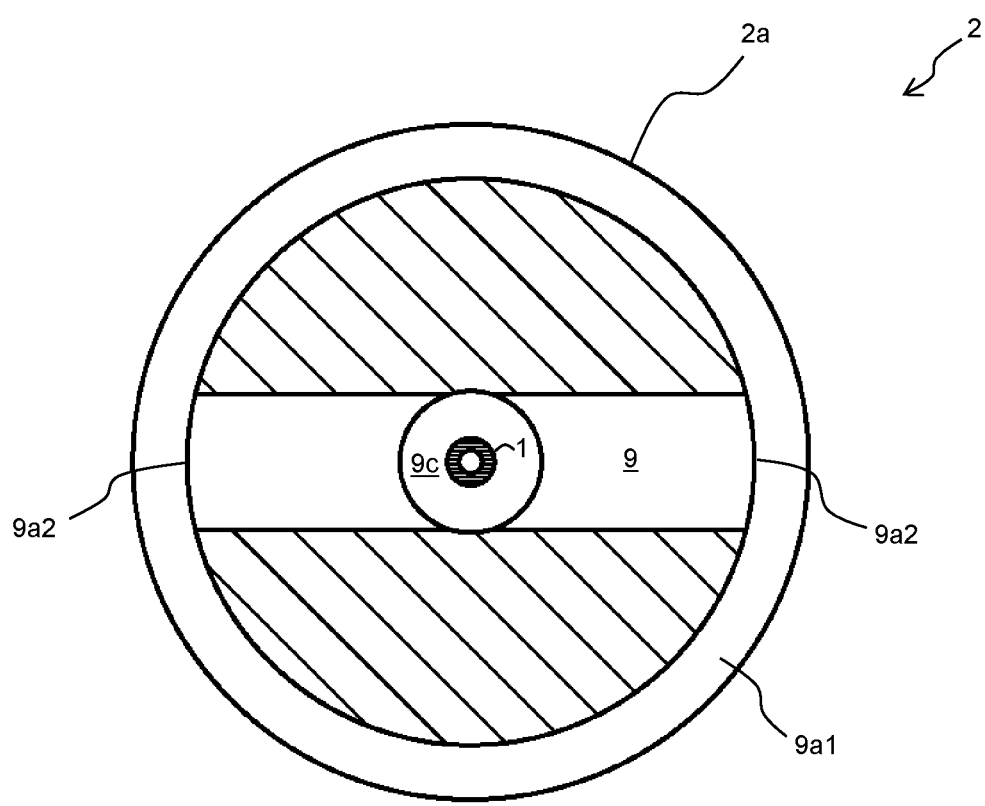
FIG. 6 is a cross-sectional view taken along an A-A line in FIG. 5.
Figure 7:
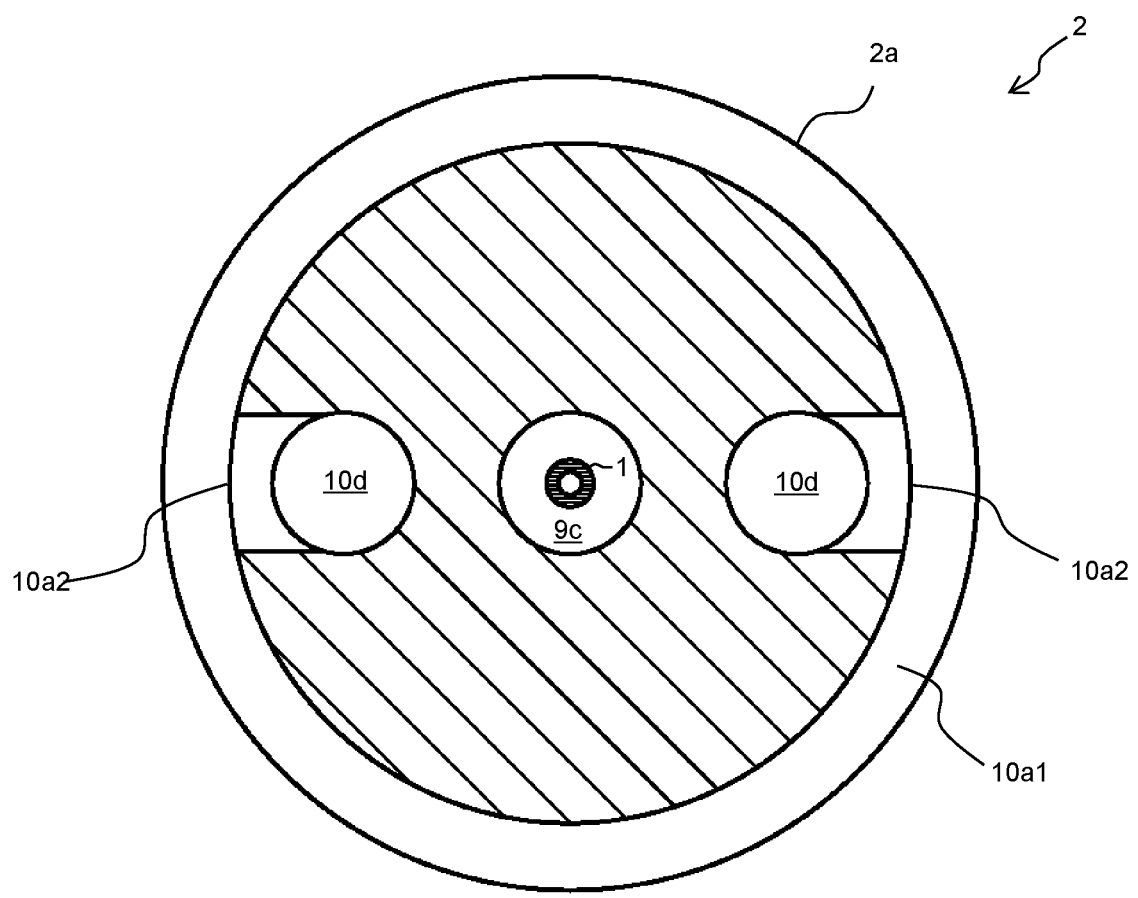
FIG. 7 is a cross-sectional view taken along a B-B line in FIG. 5.

As shown in FIG. 1, FIG. 2, and FIG. 5, a first flow path 9 connecting the first connection port 9a and the ejection opening 2d is formed in the electrode guide 2. The first flow path 9 is connected to the first supply path 7 as described below and serves as a flow channel of the compressed working fluid supplied from the working fluid supplying device 5. The first flow path 9 comprises a working fluid filling region 9c formed between the tool electrode 1 inserted along the central axis of the electrode guide 2 and an inner surface of the electrode guide 2. That is, the first flow path 9 is connected to the ejection opening 2d via the working fluid filling region 9c. When the working fluid supplying device 5 supplies the compressed working fluid to the first supply path 7 and the first flow path 9, the working fluid filling region 9c is filled with the working fluid. Consequently, the tool electrode 1 inserted through the working fluid filling region 9c can be efficiently cooled with the working fluid flowing in the working fluid filling region 9c, and the consumption of the tool electrode 1 during electric discharge machining can be suppressed.

As shown in FIG. 3 to FIG. 6, the first connection port 9a comprises a first annular concave portion 9a1 and a plurality of first openings 9a2 formed on a bottom surface of the first annular concave portion 9a1 so as to be separated from each other in a circumferential direction of the first annular concave portion 9a1, and the first connection port 9a is connected to the first flow path 9 via the plurality of first openings 9a2. In the present embodiment, two first openings 9a2 are formed at positions facing each other in the circumferential direction of the first annular concave portion 9a1. When the working fluid supplying device 5 supplies the compressed working fluid to the first supply path 7 and the first flow path 9, the working fluid is transferred to the first flow path 9 via two first openings 9a2. Consequently, the working fluid can flow stably and uniformly in the working fluid filling region 9c. Although the two first openings 9a2 are formed in the present embodiment, three or more first openings 9a2 may be provided, and preferably, a plurality of first openings 9a2 are arranged at equal angular intervals in the circumferential direction of the first annular concave portion 9a1.

As shown in FIG. 3 to FIG. 5 and FIG. 7, a second flow path 10 for connecting the second connection port 10a and the ejection opening 2d is further formed in the electrode guide 2. The second flow path 10 is connected to the second supply path 8 as described below and serves as a flow channel of the compressed gas supplied from the compressed gas supplying device 6. The second flow path 10 comprises a compressed gas supply space 10c and a mist generation space 10e provided below the compressed gas supply space 10c, in other words, on the downstream side with respect to the flow of the compressed gas.

The compressed gas supply space 10c comprises a pair of spaces 10d provided in parallel with the longitudinal direction of the working fluid filling region 9c. In the present embodiment, the pair of spaces 10d is provided so as to interpose the working fluid filling region 9c. When the compressed gas supplying device 6 supplies the compressed gas to the second supply path 8 and the second flow path 10, the compressed gas is transferred to the mist generation space 10e via the pair of spaces 10d. Consequently, the gas can be uniformly transferred to the mist generation space 10e.

The second connection port 10a comprises a second annular concave portion 10a1 and a plurality of second openings 10a2 formed on a bottom surface of the second annular concave portion 10a1 so as to be separated from each other in a circumferential direction of the second annular concave portion 10a1, and the second connection port 10a is connected to the second flow path 10 via the plurality of second openings 10a2. In the present embodiment, two second openings 10a2 are formed at positions facing each other in the circumferential direction of the second annular concave portion 10a1. When the compressed gas supplying device 6 supplies the compressed gas to the second supply path 8 and the second flow path 10, the compressed gas flows into the second flow path 10 via the two second openings 10a2. In the present embodiment, the two second openings 10a2 are respectively connected to the pair of spaces 10d of the compressed gas supply space 10c. Such a configuration enables the compressed gas to be stably and uniformly transferred to the mist generation space 10e.

As described above, the second connection port 10a in the present embodiment is located closer to the lower surface of the electrode guide 2 than the first connection port 9a. Since the tapered portion 2a of the electrode guide 2 has a tapered shape that becomes broader downward, a sufficient space for providing the flow channel of the compressed working fluid and the compressed gas in the electrode guide 2 can be secured by arranging each of the connection ports as described above.

As shown in FIG. 5, a plurality of dies guiding the tool electrode 1 and disposed so as to be separated from each other is arranged in the working fluid filling region 9c, and a gap is provided between the tool electrode 1 and each of the dies. In the present embodiment, three dies 17a, 17b, 17c are arranged. The die 17a is arranged at an upper end of the working fluid filling region 9c. The die 17c is arranged at a lower end of the working fluid filling region 9c. The die 17b is arranged between the die 17a and the die 17c. Further, gaps 19a, 19b, 19c are provided respectively between the dies 17a, 17b, 17c and the tool electrode 1.

The deflection of the tool electrode 1 during electric discharge machining and the associated deviation of a machining position can be prevented by installing the dies 17a, 17b, 17c, and thus it is possible to perform machining with high accuracy. Further, by allowing the compressed working fluid to flow through the gaps 19a, 19b, 19c between the tool electrode 1 and the dies 17a, 17b, 17c, a negative pressure is generated due to the Venturi effect at an outflow point from the die. A very small amount of working fluid can be ejected due to this pressure difference.

Specifically, the working fluid in the working fluid filling region 9c can be ejected from the gap 19a between the tool electrode 1 and the die 17a at the upper end of the working fluid filling region 9c, thereby cooling a machining tool protruding above the working fluid filling region 9c. Further, the working fluid in the working fluid filling region 9c can be supplementally ejected to the mist generation space 10e from the gap 19c between the tool electrode 1 and the die 17c at the lower end of the working fluid filling region 9c. In this regard, the gap is preferably 0.0025 to 0.010 mm.

Figure 8:
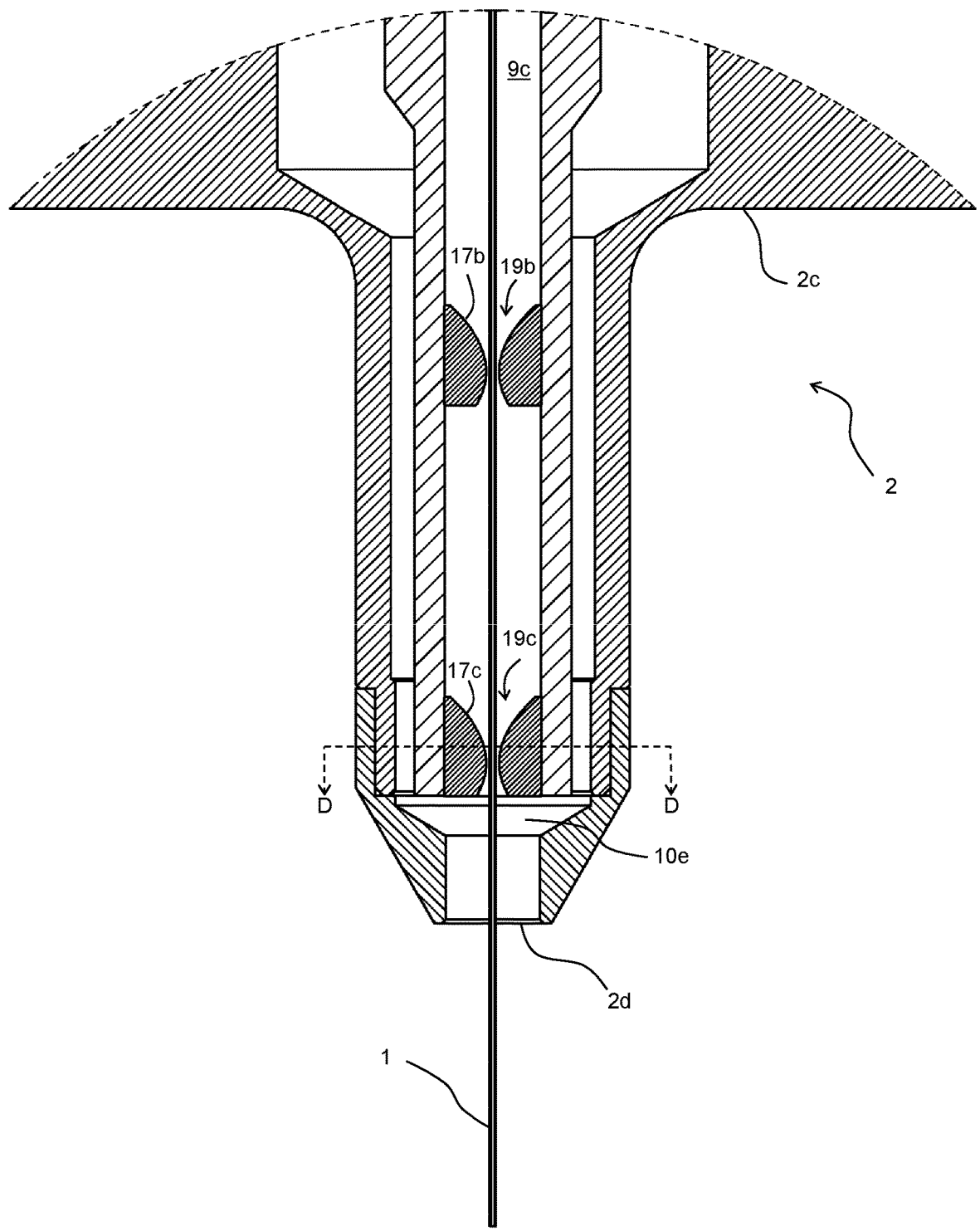
FIG. 8 is an enlarged view of a portion C in FIG. 5.
Figure 9:
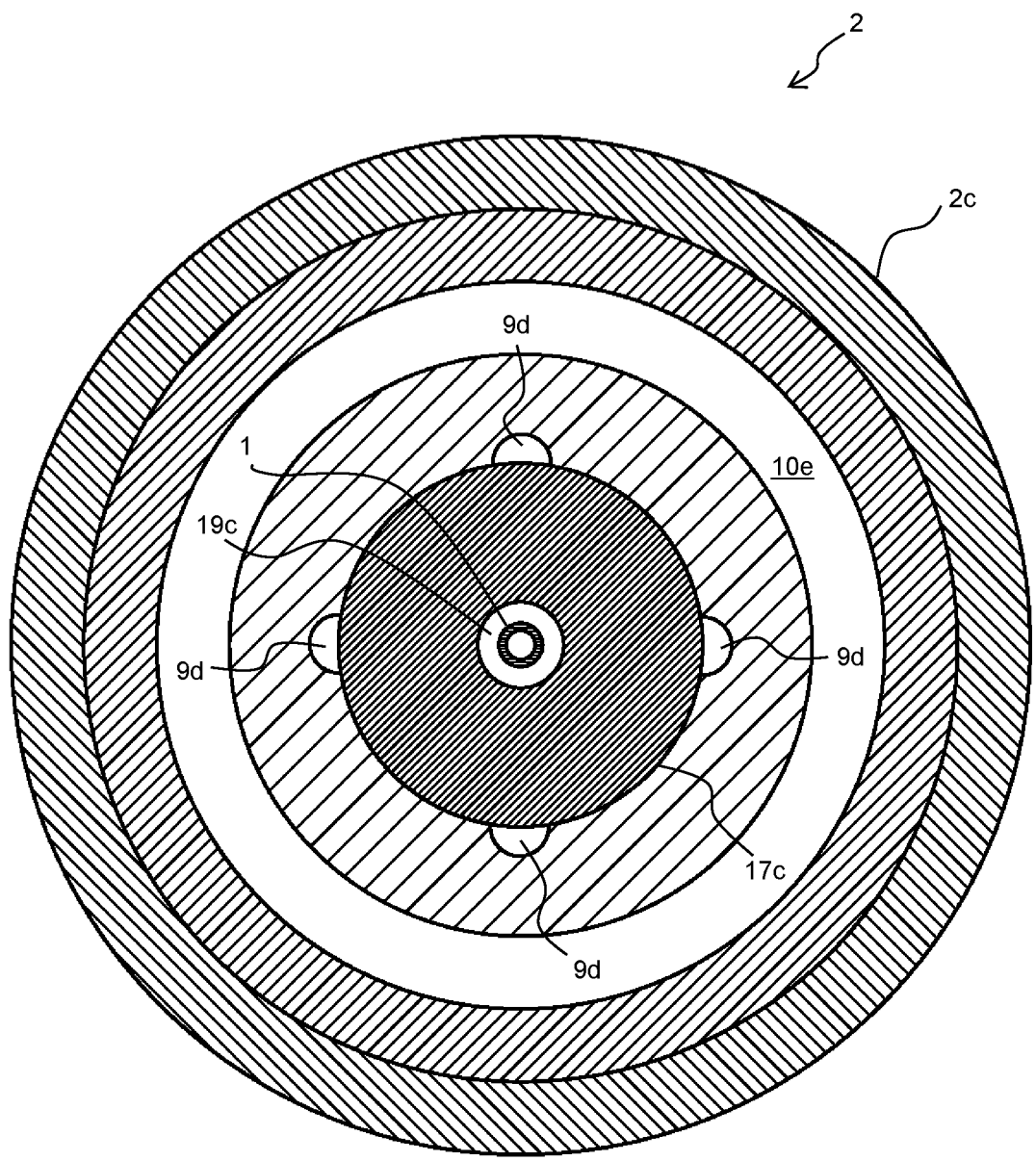
FIG. 9 is a cross-sectional view taken along a D-D line in FIG. 8.

As shown in FIG. 5 and FIG. 8, the die fixing portion 2c of the electrode guide 2 is configured to fix at least one die provided downstream from the tapered portion 2a among the plurality of dies. In the present embodiment, the dies 17b, 17c are fixed by an inner surface of the die fixing portion 2c. In addition, as shown in FIG. 9, a plurality of working fluid ejection grooves 9d is formed on the inner surface of the die fixing portion 2c so as to be separated from each other in a circumferential direction of the inner surface of the die fixing portion 2c. In the present embodiment, four working fluid ejection grooves 9d having a substantially semicircular cross section with the same diameter are formed at 90-degree intervals in the circumferential direction of the inner surface of the die fixing portion 2c so as to extend in a direction of the central axis of the electrode guide 2.

With such a configuration, the compressed working fluid in the working fluid filling region 9c can be uniformly supplied to the mist generation space 10e via the working fluid ejection grooves 9d, and the mist can be generated in the mist generation space 10e and ejected stably from the ejection opening 2d. Further, the flow rate of the working fluid can be adjusted by adjusting the number or size of the working fluid ejection grooves 9d. Therefore, it is not necessary to further perform machining on the die typically made of a hard-to-cut material, such as sapphire, for the purpose of adjusting the flow rate.

In addition, by allowing the compressed working fluid to flow through the working fluid ejection grooves 9d, a negative pressure is generated due to the Venturi effect at an outflow point from the working fluid ejection grooves 9d. This pressure difference enables the working fluid to be ejected from the working fluid ejection grooves 9d, and the mist can be generated more efficiently in the mist generation space 10e. Although the number, shape, arrangement and the like of the working fluid ejection grooves 9d are not limited to the above-mentioned configuration, it is preferable to arrange the working fluid ejection grooves 9d having the same size and shape at equal angular intervals in the circumferential direction of the inner surface of the die fixing portion 2c. When the working fluid ejection groove 9d has a substantially semicircular cross section, the groove radius is preferably 0.1 to 0.4 mm.

As shown in FIG. 3 to FIG. 5, at least one annular groove 13 extending along the circumferential direction of the tapered portion 2a is formed on the tapered surface 2b of the tapered portion 2a, and an O-ring 14 is fitted into the annular groove 13. At least one of the annular grooves 13 is formed between the first connection port 9a and the second connection port 10a. In the present embodiment, three annular grooves 13 are respectively formed above the first connection port 9a, between the first connection port 9a and the second connection port 10a, and below the second connection port 10a, and the O-ring 14 is fitted into each groove.

The electrode guide 2 is biased upward by the pull-up mechanism while being fitted in the housing 3. Consequently, the O-ring 14 fitted into the annular groove 13 is pressed and deformed by a bottom surface of the annular groove 13 and the tapered surface 3b of the housing 3, as shown in FIG. 1 and FIG. 2. Consequently, both sides of each of the first connection port 9a and the second connection port 10a are sealed by the O-rings 14 along the tapered surface 2b of the tapered portion 2a. In this way, the working fluid and the compressed gas leaking from the connection ports can be prevented from further leaking to the outside of the electrode guide 2.

2. Attachment Method of Electrode Guide and Tool Electrode

As shown in FIG. 1 and FIG. 2, when the electrode guide 2 is attached, the tapered portion 2a of the electrode guide 2 is fitted into the fitting hole 3a of the housing 3 from below so that the tapered surface 2b of the tapered portion 2a can be in close contact with the tapered surface 3b of the housing 3, in order to connect the first flow path 9 and the first supply path 7 via the first connection port 9a and the first supply path outlet 7a and to connect the second flow path 10 and the second supply path 8 via the second connection port 10a and the second supply path outlet 8a. Consequently, the flow channels of the working fluid and the compressed gas formed in the electrode guide 2 and the housing 3 are connected to each other.

In this way, since a position of the electrode guide 2 with respect to the housing 3 in the direction of the central axis of the electrode guide 2 is uniquely determined by fitting the tapered portion 2a into the fitting hole 3a, it is easy to connect the flow path and the supply path. In addition, since the first connection port 9a and the second connection port 10a in the present embodiment each comprise the annular concave portion extending along the circumferential direction of the tapered portion 2a and can be connected respectively to the first supply path outlet 7a and the second supply path outlet 8a at any positions in the circumferential direction, the flow path and the supply path can be connected more easily and reliably.

The electrode guide 2 fitted to the housing 3 is attached to the pull-up mechanism (not shown) disposed above the electric discharge machining unit 100. In this state, the tool electrode 1 is inserted from above or below the electrode guide 2 along the central axis of the electrode guide 2 and is attached to the rotation driving unit (not shown) disposed above the electric discharge machining unit 100.

3. Mist Generation in Electric Discharge Machining

Next, the mist generation in electric discharge machining will be described in more detail.

As shown in FIG. 1, FIG. 5, FIG. 8, and FIG. 9, the working fluid filling region 9c in the present embodiment communicates with the mist generation space 10e via the gap 19c and the working fluid ejection grooves 9d. Therefore, the compressed working fluid supplied from the working fluid supplying device 5 is ejected from the working fluid filling region 9c into the mist generation space 10e through the gap 19c and the working fluid ejection grooves 9d. The compressed working fluid is then mixed with the compressed gas in the mist generation space 10e to be atomized into a mist form and is ejected as mist along the tool electrode 1 from the ejection opening 2d. Consequently, the machining chips in the vicinity of the portion to be machined can be efficiently removed. Further, the tool electrode 1 can be rotated by the rotation driving unit, as described above. Consequently, the mist ejected from the ejection opening 2d can be diffused more uniformly.

When the working fluid is ejected in the mist form, it is preferable to generate the mist on a lower side of the electric discharge machining unit 100 at a position closer to the portion to be machined. When the working fluid is mixed with the compressed gas at a position farther from the portion to be machined, the generated mist may aggregate in the process of being transferred to the portion to be machined, and the size of the mist fine particles is increased, so that the effect of removing the machining chips is reduced. In the present embodiment, the first connection port 9a and the second connection port 10a are provided at different heights from each other, and both sides of each of the first connection port 9a and the second connection port 10a are sealed by the O-rings 14 along the tapered surface 2b of the tapered portion 2a. Consequently, the working fluid and the compressed gas leaking from the respective connection port can be prevented from being mixed with each other before reaching the mist generation space 10e, and it becomes possible to generate and stably transfer a high-quality mist to the vicinity of the portion to be machined.

4. Other Embodiments

Although the preferred embodiments of the present invention have been described above, the present invention is not limited to the above-mentioned embodiments. That is, various design changes can be made within the scope of the claims.

In the above-mentioned embodiments, the housing 3 and the electrode guide 2 are each provided with two flow-channels respectively for the compressed gas and the compressed working fluid, and the working fluid is mixed with the compressed gas to be ejected as mist. In another embodiment, for example, only the flow channel of the compressed working fluid may be provided, in order to eject the working fluid from the ejection opening 2d formed on the lower surface of the electrode guide 2.

INDUSTRIAL APPLICABILITY

As described above, the present invention provides an electric discharge machining unit in which the flow channels can be reliably and easily connected between components when being attached to the electric discharge machining apparatus and that can stably supply the working fluid to the vicinity of the portion to be machined. The electric discharge machining unit of the present invention can be specifically applied to a fine hole electric discharge machining apparatus, an engraving electric discharge machining apparatus, a mist electric discharge machining apparatus and the like.

REFERENCE SIGNS LIST

1: tool electrode
2: electrode guide
2a: tapered portion
2b: tapered surface
2c: die fixing portion
2d: ejection opening
3: housing
3a: fitting hole
3b: tapered surface
5: working fluid supplying device
6: compressed gas supplying device
7: first supply path
7a: first supply path outlet
8: second supply path
8a: second supply path outlet
9: first flow path
9a: first connection port
9a1: first annular concave portion
9a2: first opening
9c: working fluid filling region
9d: working fluid ejection groove
10: second flow path
10a: second connection port
10a1: second annular concave portion
10a2: second opening
10c: compressed gas supply space
10d: space
10e: mist generation space
13: annular groove
14: O-ring
17a: die
17b: die
17c: die
19a: gap
19b: gap
19c: gap
100: electric discharge machining unit

The invention claimed is:

1. An electric discharge machining unit comprising:
a tool electrode, a housing, an electrode guide, and a working fluid supplying device,
wherein the tool electrode is inserted through the electrode guide along a central axis of the electrode guide to perform electric discharge machining on a workpiece,
the housing further comprises a fitting hole having a tapered surface, the tapered surface being provided with a first supply path outlet,
a first supply path connecting the working fluid supplying device and the first supply path outlet is formed in the housing,
the electrode guide comprises a tapered portion tapering upward and an ejection opening formed on a lower surface,
a first connection port is provided on a tapered surface of the tapered portion, a first flow path connecting the first connection port and the ejection opening is formed in the electrode guide, the tapered portion is configured to be fitted into the fitting hole to connect the first flow path to the first supply path via the first connection port and the first supply path outlet, the working fluid supplying device is configured to supply working fluid to the first supply path and the first flow path, the working fluid being ejected from the ejection opening, the first connection port comprises a first annular concave portion and a plurality of first openings, the first annular concave portion extends along a circumferential direction of the tapered portion, the plurality of first openings are formed on a bottom surface of the first annular concave portion to be separated from each other in a circumferential direction of the first annular concave portion, and the first connection port is connected to the first flow path via the first openings.

2. The electric discharge machining unit of claim 1, wherein the first flow path comprises a working fluid filling region formed between the tool electrode and an inner surface of the electrode guide and is connected to the ejection opening via the working fluid filling region.

3. The electric discharge machining unit of claim 2, further comprising:
a compressed gas supplying device,
wherein a second supply path outlet is provided on the tapered surface of the housing,
a second supply path connecting the compressed gas supplying device and the second supply path outlet is formed in the housing,
a second connection port is provided on the tapered surface of the tapered portion,
a second flow path connecting the second connection port and the ejection opening is formed in the electrode guide and comprises a compressed gas supply space and a mist generation space provided downstream from the compressed gas supply space,
the working fluid filling region communicates with the mist generation space and is connected to the ejection opening via the mist generation space,
the tapered portion is configured to be fitted into the fitting hole to connect the second flow path to the second supply path via the second connection port and the second supply path outlet,
the compressed gas supplying device is configured to supply compressed gas to the second supply path and the second flow path, and
the working fluid is mixed with the compressed gas in the mist generation space to be atomized and ejected as mist from the ejection opening.

4. The electric discharge machining unit of claim 3, wherein the second connection port is arranged closer to the lower surface of the electrode guide than the first connection port.

5. The electric discharge machining unit of claim 3, wherein the first connection port and the second connection port are provided at different heights from each other,
at least one annular groove extending along a circumferential direction of the tapered portion between the first connection port and the second connection port is formed on the tapered surface of the tapered portion, and
an O-ring is fitted into the annular groove.

6. The electric discharge machining unit of claim 3, wherein the compressed gas supply space of the second flow path comprises a pair of spaces provided along the working fluid filling region.

7. The electric discharge machining unit of claim 3, wherein the second connection port comprises a second annular concave portion and a plurality of second openings,
the second annular concave portion extends along a circumferential direction of the tapered portion,
the plurality of second openings is formed on a bottom surface of the second annular concave portion to be separated from each other in a circumferential direction of the second annular concave portion, and
the second connection port is connected to the second flow path via the second openings.

8. The electric discharge machining unit of claim 3, further comprising:
a plurality of dies guiding the tool electrode and arranged to be separated from each other,
wherein a gap is provided between the tool electrode and each of the dies,
the electrode guide further comprises a die fixing portion provided downstream from the tapered portion,
the die fixing portion is configured to fix at least one die, among the plurality of dies, arranged downstream from the tapered portion,
a plurality of working fluid ejection grooves is formed on an inner surface of the die fixing portion to be separated from each other in a circumferential direction of the inner surface of the die fixing portion, and
the working fluid filling region communicates with the mist generation space via the working fluid ejection grooves.

9. The electric discharge machining unit of claim 1, further comprising:
a plurality of dies guiding the tool electrode and arranged to be separated from each other,
wherein a gap is provided between the tool electrode and each of the dies.

10. The electric discharge machining unit of claim 1, wherein the tool electrode is configured to be rotatable about the central axis.

11. An electric discharge machining unit comprising a tool electrode, a housing, an electrode guide, a working fluid supplying device, and a compressed gas supplying device,
wherein the tool electrode is inserted through the electrode guide along a central axis of the electrode guide to perform electric discharge machining on a workpiece,
the housing further comprises a fitting hole having a tapered surface, the tapered surface being provided with a first supply path outlet and a second supply path outlet,
a first supply path connecting the working fluid supplying device and the first supply path outlet is formed in the housing,
a second supply path connecting the compressed gas supplying device and the second supply path outlet is formed in the housing,
the electrode guide comprises a tapered portion tapering upward and an ejection opening formed on a lower surface,
a first connection port and a second connection port are provided on a tapered surface of the tapered portion,
a first flow path connecting the first connection port and the ejection opening is formed in the electrode guide, a second flow path connecting the second connection port and the ejection opening is formed in the electrode guide, the first flow path comprises a working fluid filling region formed between the tool electrode and an inner surface of the electrode guide and is connected to the ejection opening via the working fluid filling region, the second flow path comprises a compressed gas supply space and a mist generation space provided downstream from the compressed gas supply space, the working fluid filling region communicates with the mist generation space and is connected to the ejection opening via the mist generation space, the tapered portion is configured to be fitted into the fitting hole to connect the first flow path to the first supply path via the first connection port and the first supply path outlet and to connect the second flow path to the second supply path via the second connection port and the second supply path outlet, the working fluid supplying device is configured to supply working fluid to the first supply path and the first flow path, the compressed gas supplying device is configured to supply compressed gas to the second supply path and the second flow path, and the working fluid is mixed with the compressed gas in the mist generation space to be atomized and ejected as mist from the ejection opening.

12. The electric discharge machining unit of claim 11, wherein the first connection port comprises a first annular concave portion and a plurality of first openings, the first annular concave portion extends along a circumferential direction of the tapered portion, the plurality of first openings are formed on a bottom surface of the first annular concave portion to be separated from each other in a circumferential direction of the first annular concave portion, and the first connection port is connected to the first flow path via the first openings.

13. The electric discharge machining unit of claim 11, wherein the second connection port is arranged closer to the lower surface of the electrode guide than the first connection port.

14. The electric discharge machining unit of claim 11, wherein the first connection port and the second connection port are provided at different heights from each other, at least one annular groove extending along a circumferential direction of the tapered portion between the first connection port and the second connection port is formed on the tapered surface of the tapered portion, and an O-ring is fitted into the annular groove.

15. The electric discharge machining unit of claim 11, wherein the compressed gas supply space of the second flow path comprises a pair of spaces provided along the working fluid filling region.

16. The electric discharge machining unit of claim 11, wherein the second connection port comprises a second annular concave portion and a plurality of second openings, the second annular concave portion extends along a circumferential direction of the tapered portion, the plurality of second openings is formed on a bottom surface of the second annular concave portion to be separated from each other in a circumferential direction of the second annular concave portion, and the second connection port is connected to the second flow path via the second openings.

17. The electric discharge machining unit of claim 11, further comprising a plurality of dies guiding the tool electrode and arranged to be separated from each other, wherein a gap is provided between the tool electrode and each of the dies.

18. The electric discharge machining unit of claim 11, further comprising a plurality of dies guiding the tool electrode and arranged to be separated from each other, wherein a gap is provided between the tool electrode and each of the dies, the electrode guide further comprises a die fixing portion provided downstream from the tapered portion, the die fixing portion is configured to fix at least one die, among the plurality of dies, arranged downstream from the tapered portion, a plurality of working fluid ejection grooves is formed on an inner surface of the die fixing portion to be separated from each other in a circumferential direction of the inner surface of the die fixing portion, and the working fluid filling region communicates with the mist generation space via the working fluid ejection grooves.

19. The electric discharge machining unit of claim 11, wherein the tool electrode is configured to be rotatable about the central axis.

* * * * *